(12) United States Patent
Takagi

(10) Patent No.: US 8,879,081 B2
(45) Date of Patent: Nov. 4, 2014

(54) PRINTING APPARATUS, PRINTING CONTROL APPARATUS AND PRINTING CONTROL METHOD

(71) Applicant: Seiko Epson Corporation, Tokyo (JP)

(72) Inventor: Toshimitsu Takagi, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/630,051

(22) Filed: Sep. 28, 2012

(65) Prior Publication Data

US 2013/0107301 A1    May 2, 2013

(30) Foreign Application Priority Data

Sep. 28, 2011  (JP) ................. 2011-212180

(51) Int. Cl.
*G06F 3/12* (2006.01)
*G06F 15/00* (2006.01)
*H04N 1/60* (2006.01)
*G06K 15/02* (2006.01)

(52) U.S. Cl.
CPC .............. *G06K 15/02* (2013.01); *G06F 3/1285* (2013.01); *G06F 3/128* (2013.01); *G06F 3/1239* (2013.01); *G06K 15/1889* (2013.01); *G06F 3/1219* (2013.01); *G06K 15/1822* (2013.01); *G06F 3/1258* (2013.01)
USPC .......... 358/1.13; 358/1.15; 358/1.16; 358/1.9

(58) Field of Classification Search
None
See application file for complete search history.

(56) References Cited

U.S. PATENT DOCUMENTS

| | | | |
|---|---|---|---|
| 2007/0236720 A1 | 10/2007 | Tamada et al. | |
| 2008/0037058 A1* | 2/2008 | Ban | 358/1.15 |
| 2009/0314837 A1* | 12/2009 | Kataoka et al. | 235/385 |
| 2011/0051164 A1* | 3/2011 | Toizumi et al. | 358/1.13 |

FOREIGN PATENT DOCUMENTS

| | | |
|---|---|---|
| EP | 1 215 877 A2 | 6/2002 |
| EP | 2 068 550 A1 | 6/2009 |
| JP | 11-184662 A | 7/1999 |
| JP | 2003-122525 A | 4/2003 |
| JP | 2004-330639 A | 11/2004 |
| JP | 2005-047130 A | 2/2005 |
| JP | 2007-282061 A | 10/2007 |
| JP | 2007-283719 A | 11/2007 |
| JP | 2009-113209 A | 5/2009 |

* cited by examiner

*Primary Examiner* — Marivelisse Santiago Cordero
*Assistant Examiner* — Moustapha Diaby
(74) *Attorney, Agent, or Firm* — Nutter McClennen & Fish LLP

(57) ABSTRACT

A multifunction machine includes, a print setting section that performs setting to contribute to a reduction in the environmental load, based on designated content with respect to an operating panel of the multifunction machine or an external computer, an eco-printing judging section that judges whether printing according to the applied setting corresponds to eco-printing which is environment-friendly printing, a logo image attaching section to attach a logo image to an image when the result of the judgment is a correspondence to eco-printing, and a printing controlling section which is caused by a printing engine to print an image to which a logo image is attached.

16 Claims, 12 Drawing Sheets

FIG. 4

| SETTING ITEM | SETTING CONTENTS |
|---|---|
| TONER SAVING | OFF/WEAK/MIDDLE/STRONG |
| COLOR MONOCHROME CONVERSION | ON/OFF |
| DUPLEX PRINTING | ON/OFF |
| LAYOUT PRINTING | OFF/2 SURFACES/4 SURFACES |

| SETTING ITEM | SETTING CONTENTS (INDIVIDUAL EVALUATION VALUE) | INDIVIDUAL EVALUATION VALUE e |
|---|---|---|
| TONER SAVING | OFF(0)/WEAK(1)/ MIDDLE(2)/STRONG(3) | 2 |
| COLOR MONOCHROME CONVERSION | ON(2)/OFF(0) | 0 |
| DUPLEX PRINTING | ON(3)/OFF(0) | 3 |
| LAYOUT PRINTING | OFF(0)/2 SURFACES(2)/ 4 SURFACES(4) | 2 |
| ... | | |

| EVALUATION VALUE E (= Σ INDIVIDUAL EVALUATION VALUE e) |
|---|
| 70 |

IN A CASE WHERE EVALUATION VALUE IS SMALL

IN A CASE WHERE EVALUATION VALUE IS LARGE

IN A CASE WHERE EVALUATION VALUE IS SMALL

IN A CASE WHERE EVALUATION VALUE IS LARGE

FIG. 10

| SETTING ITEM | SETTING CONTENTS | INDIVIDUAL EVALUATION VALUE e1 | INDIVIDUAL EVALUATION VALUE e2 | INDIVIDUAL EVALUATION VALUE e3 |
|---|---|---|---|---|
| TONER SAVING | MIDDLE | 0 | 2 | 0 |
| COLOR MONOCHROME CONVERSION | OFF | 0 | 0 | 0 |
| DUPLEX PRINTING | ON | 0 | 0 | 5 |
| LAYOUT PRINTING | 2 SURFACES | 2 | 2 | 5 |
| ... | | | | |
| EVALUATION VALUE Ei ($=\Sigma$ INDIVIDUAL EVALUATION VALUE ei; i = 1 TO 3) | | 40 | 60 | 80 |

PRINTING APPARATUS, PRINTING CONTROL APPARATUS AND PRINTING CONTROL METHOD

BACKGROUND

1. Technical Field

The present invention relates to a printing apparatus which performs environment-friendly printing which takes the environment into consideration, a printing control apparatus, a printing control method and a printing control program.

2. Related Art

In recent years, in order to reduce the load on the global environment, there has been demand for a printing apparatus such as a printer or a multifunction machine which has a function of environment-friendly printing (hereinafter, referred to as "eco-printing") which takes the environment into consideration. As an example of environment-friendly printing, there have been known energy-saving printing which suppresses power consumption during printing or standby, printing using recording materials with a low environmental load, such as an ink that is produced using soybeans as a raw material, printing which suppresses the environmental load of the printing medium, such as the use of recycled paper or layout printing, and the like.

In addition, it is necessary to have more users use an environment-friendly printing function to further exhibit an effect of reducing the environmental load using the environment-friendly printing mentioned above.

Therefore, in JP-A-2007-283719, there is disclosed a printing apparatus which reads out data from an IC tag provided in environment-friendly consumable goods, judges from the read-out data, and prints a logo when printing using environment-friendly consumable goods. This informs a user that the printed matter that is a printing result is printed using environment-friendly consumable goods, and thereby improving the user's consciousness of environmental measures.

However, in the technology described in JPA-2007-283719, even if printing is not environment-friendly printing, there is a possibility to print the logo by mistake. For example, after consuming an environment-friendly recording material such as a toner cartridge, when the user refills the toner cartridge with new recording material and reuses the environment-friendly consumable goods, the logo is printed even though the recharged recording material is not environment-friendly recording material, but rather a normal recording material. Therefore, there is a problem in that the user who sees the printed matter that is the printing result mistakes the printed matter for a result of environment-friendly printing, even in a case where the printed matter is not actually a result of environment-friendly printing.

SUMMARY

The invention can be realized in the following forms or application examples.

Application Example 1

According to Application Example 1, there is provided a printing apparatus that prints an image including: a setting section that performs setting based on setting content designated to contribute to a reduction in environmental load; a judging section that judges whether or not printing according to the setting content that is set by the setting section corresponds to environment-friendly printing which satisfies a predetermined environmental performance; an attaching section that attaches an attachment image to the image indicating that printing was performed using environment-friendly printing when the printing according to the setting content that is set corresponds to environment-friendly printing; and a printing section that prints the image to which the attachment image is attached, according to the setting content that is set by the setting section.

According to this configuration, when printing according to the setting content designated with respect to reducing environmental load corresponds to environment-friendly printing which satisfies a predetermined environmental performance, an image to which the attachment image indicating that environment-friendly printing has been performed is attached is printed. Since the attachment image is printed, a user is able to know that the printing result was printed using the environment-friendly printing. In addition, since the attachment image is attached depending on the result judged from the setting content, the attachment image is not printed by mistake in a case where the predetermined environmental performance is not satisfied, and thereby not causing a user who sees the printing result to misunderstand whether or not environment-friendly printing was performed. Therefore, this correctly informs the user who sees the printing result that the printed result was printed using environmentally-responsive printing, thereby improving the user's consciousness of the environmental measures.

Application Example 2

In the printing apparatus according to the Application Example 1, the judging section judges whether or not the printing according to the setting content that is set corresponds to environment-friendly printing, based on an environmental performance associated with the setting content.

According to this configuration, based on the environmental performance associated with the setting content, since the judgment of the environment-friendly printing, the judgment can be performed using a simple process.

Application Example 3

In the printing apparatus according to Application Example 1, the judging section judges whether or not the printing according to the setting content that is set corresponds to the environment-friendly printing, based on a combination of the environmental performances.

According to this configuration, judgment is performed more appropriately whether or not the printing corresponds to environment-friendly printing by the judgment which takes a combinations of environmental performances into consideration.

Application Example 4

In the printing apparatus according to Application Example 1, the judging section calculates an evaluation value related to the environmental performance and judges whether or not the printing according to the setting content that is set corresponds to environment-friendly printing, based on the evaluation value.

According to this configuration, because judgment is performed whether or not the printing corresponds to environment-friendly printing based on an evaluation value, it is possible to properly judge whether or not the printing corresponds to environment-friendly printing.

Application Example 5

In the printing apparatus according to Application Example 1, a threshold value which satisfies a predetermined environmental performance is changeable.

According to this configuration, a criteria of the environment-friendly printing can be appropriately changed depending on the purpose.

Application Example 6

In the printing apparatus according to Application Example 1, the setting of the setting section is performed, based on the kind of environmental performance contributing to a reduction in different kinds of environmental load, and the attaching section gives a different attachment image depending on the kind of environmental performance to which the printing according to the setting content contributes.

According to this configuration, because a different attachment image is attached depending on a setting content, a user can recognize that the attachment image changes depending on the setting set by the user, and thereby improving the user's consciousness about the environmental measures. In addition, as a method for attaching different attachment images, it is desirable to change the number, size, color, design and the like of attachment images depending on the setting.

Application Example 7

In the printing apparatus according to Application Example 1, the attaching section attaches a different attachment image depending on a contribution degree by which the printing contributes to the reduction in the environmental load.

According to this configuration, a different attachment image is printed depending on the kind of environmental performance to which that printing according to the setting content contributes. In so doing, a user can know from the printing result how much the setting set by the user contributes with respect to the environment, thereby improving the user's consciousness about the environmental measures.

Application Example 8

The printing apparatus according to Application Example 1, further includes an operating section that accepts an operation which designates the setting content contributing to the reduction in the environmental load, and a receiving section that receives a print job and print setting data which designates the setting of the print job, wherein, with respect printing of the print job, the setting section preferentially applies the setting content that is designated in the printing setting data received by the receiving section rather than the setting content that is designated in the operating section.

According to this configuration, the setting content designated in the printing setting data of print job is preferentially applied rather than the setting content designated in the operating section of the printing apparatus. Because the setting for the print job is reliably reflected in printing, a printing result using the setting that a user who ordered printing of the print job intended can be obtained. In addition, through a printed attachment image, a user can know from the printing result whether or not printing according to the setting content that the user designated corresponds to environment-friendly printing.

Application Example 9

The printing apparatus according to Application Example 1, further includes an operating section that accepts an operation which designates the setting contributing to the reduction in the environmental load, and a receiving section that receives a print job and print setting data which designates the setting of the print job, wherein, the setting section preferentially applies the setting content designated in the operating section rather than the setting content designated in the printing setting data received by the receiving section.

According to this configuration, because the setting content designated in the operating section of the printing apparatus is preferentially applied rather than the setting content designated in the printing setting data of print job, setting content designated by a user operation with respect to an operating section is reliably reflected in the printing. For example, this is useful for a case where a manager or the like of a printing apparatus limits the settings that permit the use of the printing apparatus from an operating section and the like. In so doing, it is possible to know whether or not printing according to the limited setting content corresponds to environment-friendly printing from a printing result.

Application Example 10

According to Application Example 10, there is provided a printing control apparatus that controls printing of image, including: a setting section that performs setting based on designated setting content, the setting content being designated to contribute to a reduction in environmental load; a judging section that judges whether or not printing according to the setting content that is set by the setting section corresponds to environment-friendly printing which satisfies a predetermined environmental performance; an attaching section that attaches an attachment image to the image indicating that printing was performed using environment-friendly printing when the printing according to the setting content that is set corresponds to environment-friendly printing; and a printing control section that causes, according to the setting content that is set by the setting section, the image to which the attachment image is attached to be printed.

According to this configuration, because an image to which the attachment image is attached according to the setting content is printed, a user can know that the printing result was printed using environment-friendly printing which satisfies the predetermined environmental performance.

Application Example 11

According to Application Example 11, there is provided a printing control method that controls the printing of an image, including: setting based on designated setting content, the setting content being designated to contribute to a reduction in environmental load; judging whether or not printing according to the setting content that is set by the setting section corresponds to environment-friendly printing which satisfies a predetermined environmental performance; attaching an attachment image to the image indicating that printing was performed using environment-friendly printing when the printing according to the setting content that is set corresponds to environment-friendly printing; and causing, according to the setting content that is set, the image to which the attachment image is attached to be printed.

Application Example 12

According to Application Example 12, there is provided a printing control program that controls the printing of an image, by which a computer performs the following functions: a setting section that performs setting based on designated setting content, the setting content being designated to contribute to a reduction in environmental load; a judging section that judges whether or not printing according to the setting content that is set by the setting section corresponds to environment-friendly printing which satisfies a predetermined environmental performance; an attaching section that attaches an attachment image to the image indicating that printing was performed using environment-friendly printing when the printing according to the setting content that is set corresponds to environment-friendly printing; and a printing control section that causes, according to the setting content that is set by the setting section, the image to which the attachment image is attached to be printed.

In the printing control method and the printing control program according to Application Examples 11 and 12, because an image to which the attachment image is attached is printed according to the setting content, a user can know that the printing result was printed using environment-friendly printing which satisfies the predetermined environmental performance.

BRIEF DESCRIPTION OF THE DRAWINGS

The invention will be described with reference to the accompanying drawings, wherein like numbers reference like elements.

FIG. 4 is a diagram illustrating the setting items computer side.

FIG. 5 is a view explaining a calculation method of evaluation value.

FIG. 10 is a view explaining a calculation method of evaluation value related to a second embodiment.

DESCRIPTION OF EXEMPLARY EMBODIMENTS

Figure 1:
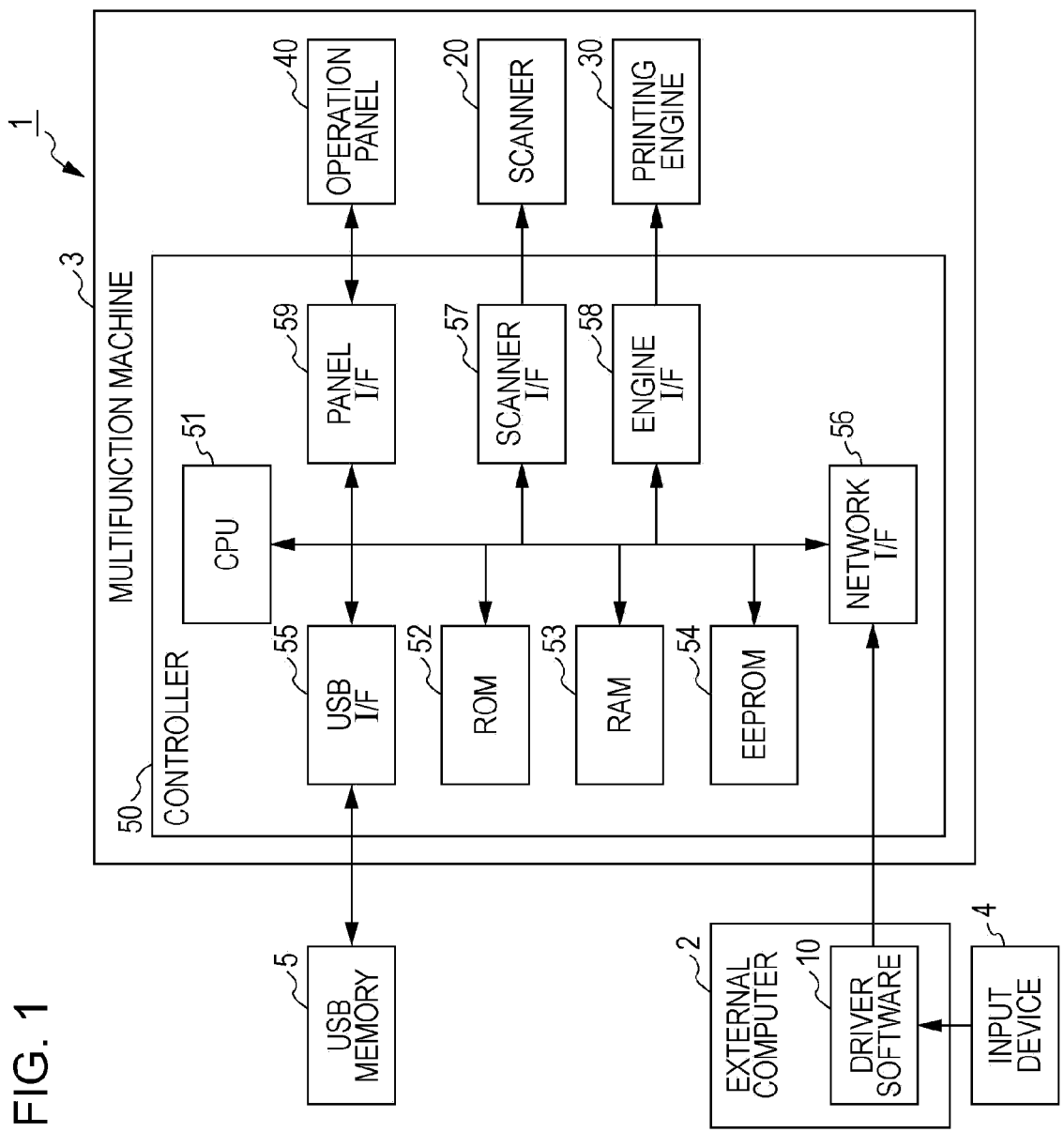
FIG. 1 is a diagram illustrating a schematic configuration of image processing system related to a first embodiment.

Herein below, explanation of the embodiments of the invention will be described with reference to the accompanying drawings.
First Embodiment FIG. 1 shows a diagram illustrating a schematic configuration of image processing system related to a first embodiment. As shown in FIG. 1, an image processing system 1 includes an external computer 2 and a multifunction machine 3, and the external computer 2 and the multifunction machine 3 are connected to mutually communicate data each other through a network such as LAN (Local Area Network).

The external computer 2 is a general personal computer, for example, and a driver software 10 is installed to control the multifunction machine 3 from external. The driver software 10 transmits a printing job to the multifunction machine 3, the printing job including a print setting designated according to a user operation to an input device 4 (input section) such as a keyboard or mouse, and the print setting includes a designated print setting information, data of an image which is a target of the printing, printing instructions and the like. Further, a detail description of the print setting of the external computer 2 side will be explained later.

The multifunction machine 3 is an example of printing apparatus and is a multifunction printer having a plurality of functions such as a printer function, a copy function, a scanner function and a USB memory printing function. The multifunction machine 3 is provided with a scanner 20, a printing engine 30 (printing section), an operating panel 40 (operation section) and a controller 50.

The scanner 20 is a hardware section for reading a manuscript set in a manuscript stand and a hardware section for creating image data of the manuscript and has a carriage on which imaging elements are mounted, a scan mechanism that scans the carriage along a manuscript stand, and the like.

The scan data created by reading a manuscript of the scanner 20 are delivered to the controller 50. Further, the scanner 20, in a case where a plurality of manuscripts is set, may have a configuration of an auto document feeder (ADF) that automatically sends out the manuscript one by one to the manuscript stand.

The printing engine 30 is a hardware section that prints images such as an image data included in the printing job received from the external computer 2, a scan data and an image data read-out from a portable storage medium such as USB memory on a printing medium such as a print paper. The printing engine 30 of the embodiment is to print according to an image forming by an electrophotographic manner and has a configuration such as a charging unit, an exposure unit, a photoreceptor, a developing unit, a transferring unit, a fixing unit, a toner cartridge, a controlling unit to control the operation thereof, and so on. The photoreceptor has a cylindrical conductive substrate and a photosensitive layer formed on the outer peripheral surface of the conductive substrate and is a drum which is rotatable about a central axis. The photoreceptor is charged by the charging unit, and then, a latent image is formed by the exposure unit, and the latent image is developed using the toner by the developing unit. The toner image which is developed is transferred to the print medium such as a paper by the transferring unit. The fixing unit is provided with a fixing roller of which roller surface is covered with an elastic body such as a rubber, a drive motor to rotate the fixing roller and a heater to heat the fixing roller and the like, and the heated fixing roller fixes the toner image transferred on the printing medium, thereby, an image is formed on the print medium.

The operating panel 40 is a panel provided on the outer surface of the multifunction machine 3 in order that a user standing before multifunction machine 3 operates the multifunction machine 3. By operating according to the screen displayed on the touch panel, various instructions with respect to the multifunction machine 3 can be inputted or various sets of the multifunction machine 3 can be changed. Further, the operating panel 40 may be a configuration provided with not only the touch panel but also the display panel such as LCD (Liquid Crystal Display) and various operation buttons.

The controller 50 is a control device that controls an operation of each section of the multifunction machine 3 and is provided with a CPU 51, a ROM 52, a RAM 53, a EEPROM 54, a USB I/F 55, a network I/F (receiving unit) 56, a scanner I/F 57, an engine I/F 58 and a panel I/F 59. Further, each of these components is connected to be able to communicate data to each other via the internal bus.

The CPU 51 is a main control device of the controller 50 and performs to control each component of the multifunction machine 3 by running various programs stored in the ROM 52 using the RAM 53 as an operation region and the like. The CPU 51 performs various processes in multifunction machine 3, such as a process that converts an image data of printing target and the like to a format which the printing engine 30 can process, a process that controls the printing engine 30 to deliver the converted data together with printing instruction to the printing engine 30, a process that controls the operating panel 40, a process that controls the scanner 20 and a process which reads out an image data from an USB memory 5, and so on. Various functions such as the printer function of the multifunction machine 3, the copy function, the scanner function and the printing function of the USB memory are realized by performing these processes by the CPU 51.

Further, the image data of a logo image which will be explained later is stored in advance in the ROM 52 or EEPROM 54.

The USB I/F 55 is an interface portion between USB device and the controller 50 and has a slot portion on which the USB memory 5 that is a portable storage medium is detachably mounted, a USB controller that performs data communication with a USB device, and the like.

The network I/F 56 is an interface portion connected to a network and performs a process controlling a communication with a destination to be connected. The multifunction machine 3 is connected to the external computer 2 and communicates with it by the multifunction machine being connected to a network via the network I/F 56.

The panel I/F 59 is an interface portion with respect to the operating panel 40 and performs a process that outputs a display signal of a touch panel to the operating panel 40 by control of the CPU 51 or a process that receives an input of operation signal from the operating panel 40.

The scanner I/F 57 is an interface portion between the controller 50 and the scanner 20 and performs a process that outputs a read-out signal to the scanner 20 by control of the CPU 51 or a process that receives scan data of image read-out by the scanner 20.

The engine I/F 58 is an interface portion between the controller 50 and the printing engine 30 and when executing a print by the printing engine 30, reads-out image data of printing target stored in the RAM 53 and performs a process that outputs an image data, which is converted to an image data having a format being able to be processed by the printing engine 30 by executing a predetermined process with respect to the read-out image data, to the printing engine 30. Further, the engine I/F 58 is provided with a memory storing data temporarily, a decompressing unit, a screen process section and the like and performs a decompressing process of compressed data, a screen process that converts the decompressed data to dot data and the like with respect to the image data read-out from RAM 53. The engine I/F 58 having these functions is specifically consisted of an ASIC (Application Specific Integrated Circuit).

Herein, the multifunction machine 3 of the embodiment is constituted such that a printing, for example, an energy saving printing suppressing power consumption at the time of printing or standby, a printing using environmental toner having a low environmental load, a printing suppressing an environmental load by a print recording material such as a toner save, a printing suppressing the environmental load by the print medium such as use of the layout printing of the recycled paper, a printing, based on the print setting contributing to the reduction of influence (environmental load) on the environment related to the confronting environment problem. Further, the multifunction machine 3 is constituted such that, with respect to a plurality of items concerning print setting such as a power-saving control method, a printing method, a type of toner and paper used to print, a user can set arbitrarily any value from the operating panel 40 or external computers 2, and thereby an eco-printing contributing to reduction in the environmental load according to the setting contents of each items that are set can be performed.

Furthermore, the multifunction machine 3 according to the embodiment, in a case where performing the eco-printing, prints a predetermined logo mark image on paper on which the image of printing target is printed. The logo mark is to inform users who see the printed matter that is the printing result that it is the printing result that the printed matter was printed by the eco-printing. As the logo mark, for example, a mark reminding global environment to a person who has seen the mark, a predetermined mark established by organizations, and the like that promotes the environmental protection and the like are used.

Figure 2:
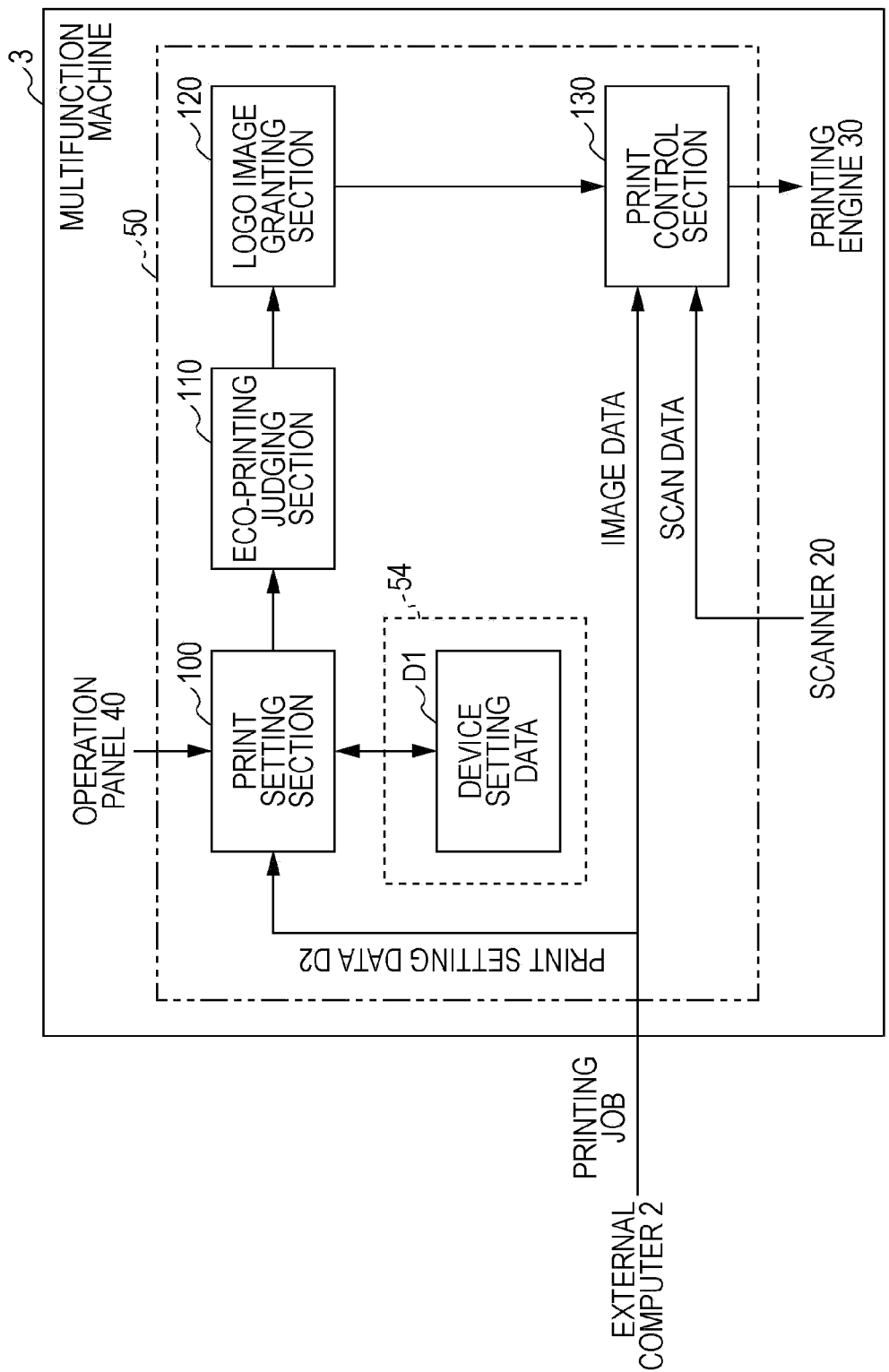
FIG. 2 is a function block diagram of a multifunction machine.

Next, a description of the configuration of the multifunction machine 3 to realize the above-mentioned features of eco-printing will be described. FIG. 2 shows a functional block diagram of the controller 50 of the multifunction machine 3. As shown in FIG. 2, the controller 50 has a print setting section 100 (setting unit), an eco-printing judging section 110 (judging unit), a logo image granting section 120 (granting section), and a printing controlling section 130.

At first, the setting items designated in the multifunction machine 3 side is explained. The print setting section 100 performs a process that determines the setting contents to be applied to the print, based on the designation by a user. In addition, the multifunction machine 3 according to the embodiment is constituted to be able to specify the setting related to the print settings contributing to reduction in the environmental load from the both sides of the multifunction machine 3 and the external computer 2. Next, an explanation of the settings designated in the multifunction machine 3 side and settings designated in the external computer 2 side will be described.

Figure 3:
FIG. 3 is a diagram illustrating an example of setting items set in the multifunction machine side.

First, setting items designated by the multifunction machine 3 side will be described. In FIG. 3, an example of setting items set by the multifunction machine 3 side is shown. As shown in FIG. 3, the items such as a toner save, a color-monochrome conversion, a double-sided printing, a layout print, an energy saving print, the fixing temperature in the electrophotographic process, the use or nonuse of the environment toner and the paper kind are included in the setting item of the multifunction machine 3 side. In addition, setting items contributing to reduction in the environmental load are not limited to them and may include, for example, items such as a startup printing that shorten the time between the time of start and the time when printing is possible, a shift of printing time that avoids a period of time when power consumption is high, a nighttime batch printing that performs a printing job collectively at night, a sleep mode, a sleep plunge time before shifting to a sleep mode. In addition, with respect to the setting of the energy-saving printing, the more specific setting items for the energy saving may include, for example, items such as a degradation of the operation clock of the controller 50, the reduction of printing speed by the printing engine 30, a shut-off of the power supply supplied to the various interfaces at the time of printing, and a brightness control of the operating panel 40 or indicator.

With respect to each of setting items of the multifunction machine 3 side described above, the desired setting contents are designated through an operation of the operating panel 40 of the multifunction machine 3 by user. For example, in a case of the toner saving, a user can designate the setting contents of any level among a plurality of levels of OFF/weak/middle/strong. The designated setting contents are stored in the memory region determined in advance of a nonvolatile memory such as the EEPROM 54 as a device setting data D1.

Then, an explanation of setting contents designated in the external computer 2 side will be described. An example of the setting items of the external computer 2 side is shown in FIG. 4. As shown in the drawing, setting items such as a toner saving, a color-monochrome conversion, a double-sided printing and a layout printing are included in the setting items contributing to reduction in the environmental load of the external computer 2 side. With respect to such items, the desired setting contents are designated by a user who operates an input device 4 such as a mouse or a keyboard connected to the external computer 2. The designated setting contents are transmitted to the multifunction machine 3 from the external computer 2 together with the printing job as a print setting data D2.

For example, when performing the printing, based on a user operation to the operating panel 40, such as a copy function or a USB memory printing function of the multifunction machine 3, the print setting section 100 applies setting contents of the multifunction machine 3 among setting contents of the multifunction machine 3 side mentioned above and setting contents of the external computer 2 side.

On the other hand, with respect to the printing of the printing job received from external computer 2, the print setting section 100 applies preferentially a setting item of the external computer 2 side rather than a setting item of the multifunction machine 3 side. In addition, each of setting items of the toner saving, the color-monochrome conversion, the double-sided printing and the layout printing which are in the setting items of the external computer 2 side as described above are overlapped with setting items of the multifunction machine 3 side. Therefore, print setting section 100 applies preferentially setting contents designated in the external computer 2 side with respect to these overlapped items and applies setting contents of the multifunction machine 3 side with respect to the items which are not overlapped. Thereby, the setting intended by a user who ordered printing to an external computer 2 is reflected to be printing.

The eco-printing judging section 110 performs a judgment as to whether or not the printing according to the setting contents determined by the print setting section 100 corresponds to an eco-printing. In this embodiment, the judgment as to whether or not the printing corresponds to an eco-printing is performed based on an evaluation value that is calculated as an index expressing an overall environmental performance with respect to an energy saving, a resource saving of toner and paper and the like from setting contents. For example, the individual evaluation value in which a contribution degree to an environment is considered for every contents of each setting item is established in advance as shown in FIG. 5 and the eco-printing judging unit 110 calculates the evaluation value E by obtaining as an individual evaluation value e an evaluation value corresponding to the setting contents for each item and then by summing the obtained individual evaluation values of each setting item. By comparing the value of this evaluation value E with the predetermined threshold value, it is determined that whether a printing according to setting contents that are set by the print setting section 100 corresponds to the eco-printing which meets a desired environmental performance. However, a method of determination is not limited to this. It may be determined by setting whether or not the printing corresponds to eco-printing for each combination of setting contents with respect to a plurality of setting items as environmental performance in advance and by depending on the combination of setting contents.

When setting contents that are applied corresponds to an eco-printing, the logo image granting section 120 performs a process giving to give a predetermined logo image (attached image) to an image which became a printing target originally by printing job and the like. In addition, the details will be described later, but the logo image granting section 120 may give a different logo image by changing the size of the logo image depending on a value of evaluation value E and the like.

The printing controlling section 130 performs control of printing by controlling the operations of the printing engine 30, the operating panel 40, the scanner 20, various interfaces and the like according to setting contents determined by the print setting section 100. For example, when a fixing temperature is set "low," to a control section of the printing engine 30, the instruction that brings down the temperature of the fixing unit is output, thereby, a control is performed to suppress the power consumption of the printing engine 30.

In addition, when printing by the printer function and the copy function is performed, the printing controlling section 130 causes the printing engine 30 to perform printing according to the print setting determined by the print setting section 100. Therefore, the printing controlling section 130 creates the image data corresponding to the setting contents of a double-sided printing, a layout printing or the like from image data and scan data of the printing target included in the printing job, and delivers the created image data with the format that can be processed by the printing engine 30, through the engine I/F 58 to the printing engine 30. In addition, when, by the logo image granting section 120, a logo image is given to an image of the printing target, the printing controlling section 130 delivers the data of an image to which the logo image is given, to the printing engine 30.

As mentioned above, the multifunction machine 3 according to the embodiment, when the print setting corresponds to an eco-printing gives the logo image to an image of the printing target and prints it. Then, an explanation of the operation of multifunction machine 3 will be described in detail with reference to a flowchart.

Figure 6:
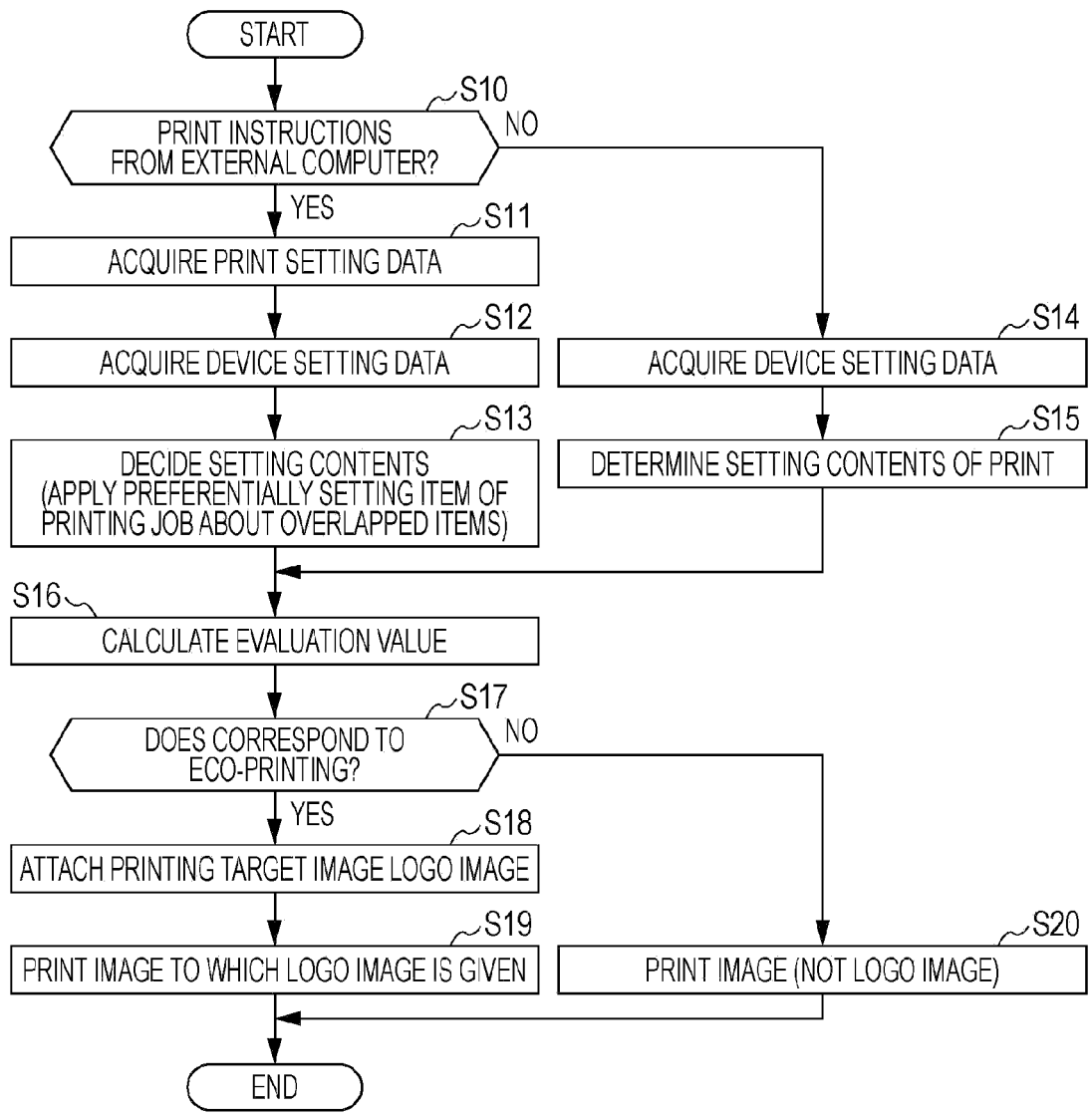
FIG. 6 is a flowchart illustrating an operation sequence of the multifunction machine.

For example, in a case where a printing instruction for the printer function by printing job was input into multifunction machine 3 from the external computer 2, in a case where a printing instruction for copy function or a USB memory printing function was entered by an operation from the operating panel 40, or the like, the processing of FIG. 6 is started. When the process is started in FIG. 6, the print setting section 100 determines whether or not the printing instruction that was input was a printing instruction from the external computer 2 (Step S10).

If the printing instruction was a printing instruction from the external computer 2 (Step 10: Yes), the print setting section 100 acquires the print setting data D2 included in the printing job received from the external computer 2 (Step 11) and acquires the device setting data D1 specified for the operating panel 40 of the multifunction machine 3 from EEPROM 54 (Step 12). Next, with respect to the overlapped items among the setting items of the print setting data D2 and the setting items of the device setting data D1, the setting contents to be applied to printing of the received printing job are determined by preferentially applying the setting items of the print setting data D2 (Step 13).

On the other hand, in the judgment of Step S10, if the printing instruction was not a printing instruction from the external computer 2 (Step S10: No), that is, if the printing instruction was a printing instruction from the operating panel 40 of the multifunction machine 3 such as a printing of the copy function, a USB memory printing, the process proceeds to Step S14. In this case, the print setting section 100 acquires the device setting data D1 from EEPROM 54 (Step S14), and applies the setting contents of a device setting data D1 (Step S15), and thereby determining the setting contents of the print performed by a user operation to the operating panel 40.

If setting contents of the printing are determined, the eco-printing judging section 110 calculates evaluation value E from the determined setting contents (Step S16), and judges whether or not a printing according to the setting contents that are determined based on a value of evaluation value E corresponds to an eco-printing (Step S17). If the evaluation value E is larger than the predetermined threshold value, it is judged whether or not the print corresponds to the eco-printing (Step S17: Yes) and the logo image granting section 120 gives a logo image to an image of the printing target (Step S18). Then, the printing controlling section 130 causes an image with a logo image to be printed by delivering the data of an image to which a logo image is given, to the printing engine 30 (Step S19).

Figure 7:
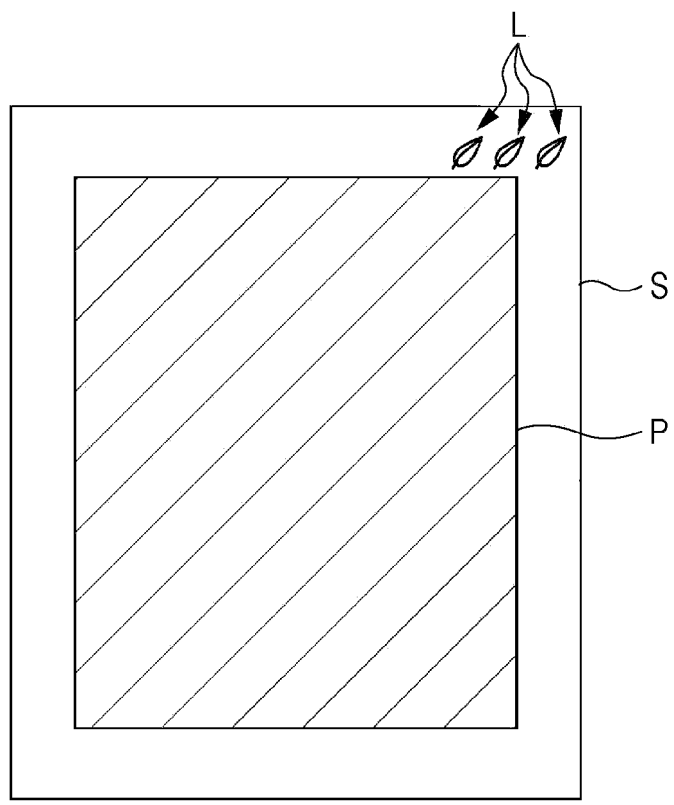
FIG. 7 is a diagram illustrating an example of a printing result to which a logo image is given.

FIG. 7 shows an example of the printing results of an image to which a print logo has been given. As shown in FIG. 7, on printing paper S of printing results, the image P which is the target of the original print such as the printing job and the logo image L are printed. In addition, in the example of FIG. 7, the logo image L is located on the neighboring portion of paper S far away in the top right direction for image P of the printing target, but a position of the logo image L is not limited to this logo. For example, the logo image may be located at a header position of the neighborhood of upper section center and the footer position of the neighborhood of bottom center of the image P, and may be located at the position overlapping with the image P.

Figure 8A:
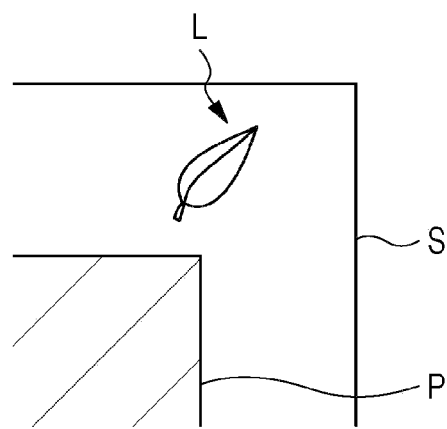
FIGS. 8A and 8B are enlarged views illustrating an example of the logo image.
Figure 8B:
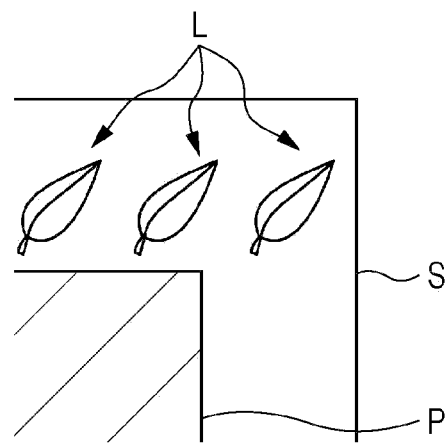
Figure 9A:
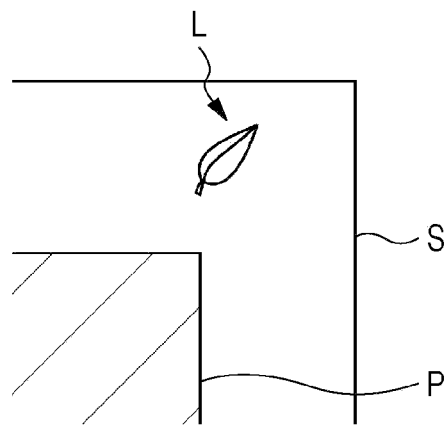
FIGS. 9A and 9B are enlarged views illustrating an example of the logo image.
Figure 9B:
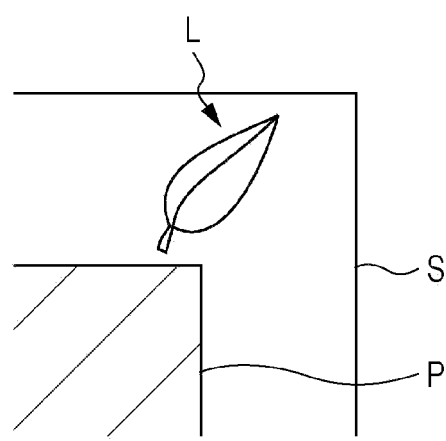

In addition, the number of logo image L that the logo image granting section 120 gives changes depending on evaluation value E to be determined from contents of the print setting. In other words, if the evaluation value E is small, the logo image granting section 120 reduces the number of the logo image L to be given as shown as an example in FIG. 8A, and if the evaluation value E is large, the number of the logo image L to be given as shown as an example in FIG. 8B increases. However, a way to change the logo image L is not limited thereto, the size of the logo image L may be changed depending on the evaluation value E determined from the setting contents. In other words, if the evaluation value E is small, as shown as an example in FIG. 9A, the logo image L is reduced, and if the evaluation value E is large, as shown as an example in FIG. 9B, the logo image L is increased. However, a density of the logo image L and the thickness of a line constituting the logo image L may be changed depending on the evaluation value E.

On the other hand, in a judgment of Step S17, if the evaluation value E is less than the predetermined threshold value, it is judged that the printing does not correspond to an eco-printing (Step S17: No) and the image P of a printing target is printed without being given the logo image L by delivering the data of the image of the printing target for the print to printing engine 30 (Step S20).

According to the multifunction machine 3 of the embodiment described above, the following effects can be obtained.

(1) When a printing according to the setting content that is designated from an operation panel 40 of a multifunction machine 3 or an external computer 2 corresponds to an environment-friendly printing which meets a predetermined environmental performance, an image P to which the attached image L is given is printed. The attached image L is given is printed. The user who see the printing result knows that the printed result is printed by an environment-friendly printing, thereby improving the user's consciousness about the environmental problem.

In addition, the use of the eco-printing can be promoted. For example, a user can appeal that the eco-printing is actively used by distributing the printed matter on which the logo image L was printed to a third party. In addition, if a manager of the multifunction machine 3 intends to investigate an actual state of use of the eco-printing, the manager can know the actual state of use of the eco-printing can be known from the printed matter of the printing result easily and manages easily the use of an eco-printing in the multifunction machine and the printer. Motivated by the above facts, the eco-printing comes to be used more actively.

(2) It is judged whether a printing corresponds to an eco-printing from the setting contents designated for the multifunction machine 3 or the external computer 2 and, when the printing corresponds to an eco-printing, the logo image L is printed, and thus when the printing is not an eco-printing, the logo image L is not printed by mistake. Therefore, with respect to a user who sees the printed matter of the printing result, without making a false belief that they are printed with an eco-printing in spite that the printing is not performed by the eco printing, it is possible to accurately inform that they are printed with an eco-printing.

(3) Because it is judged whether or not the printing corresponds to an eco-printing depending on the evaluation value E calculated from the plural setting items, even if there are plural setting items, it is judged appropriately whether or not the printing according to the setting contents of those setting items corresponds to an eco-printing, in a case where it is judged to be an eco-printing, the logo image L can be given.

(4) Because a number or size of the printed logo image L is changed depending on the evaluation value E calculated from the setting contents, a user can know from number of the logo image L of the printing result and the like how the printing contributes to an environment. Thereby, the consciousness to the environmental measures of a user is further improved and the use of the eco-printing can be promoted.

(5) In the printing of the printing job received from the external computer 2, setting contents of the print setting data D2 is preferentially applied, with respect to the items that are overlapped with each other among items of device setting data D1 and a setting item of print setting data D2, and setting contents of device setting data D1 are applied to printing with respect to the items which did not overlap. Thereby, in the printing of the printing job received from the external computer 2, print setting designated for the external computer 2 is reflected surely. Therefore, it can be obtained the printing result according to the setting intended by a user who performed operation of a printing instruction to an external computer 2, and a user can know from the printing result whether or not the printing by the intended setting corresponds to an eco-printing.

Second Embodiment

In the first embodiment mentioned above, one evaluation value E as an index to express a general environmental performance from setting contents applied to printing, and the logo image L is given depending on this evaluation value E, but the logo image L may be given based on plural kinds of an environmental performance contributing to reduction in different types of the environmental load from the setting contents. For example, as several kinds of the environmental performance, there are an environmental performance about the power consumption, an environmental performance with respect to toners such as the reduction in the toner consumption or the use of the environmental toner, an environmental performance with respect to paper such as the reduction in the use number of sheets of the paper or the use of the recycled paper, and the like. In the second embodiment, plural kinds of the logo image L are given depending on the evaluation value that is separately calculated for each of these several kinds of an environmental performance. In addition, hereinbelow, same symbols are given to the same configuration as the first embodiment, and a detailed explanation is omitted.

For example, in a case of the layout printing, by making this setting effective, the number of sheets used is reduced and the amount of toner used is also reduced. On the other hand, it will contribute to reduction in the power consumption in a case where the fixing temperature of the electrophotographic process is set low. In this way, for each setting item, the kinds of the environmental performance that contributes to reduction in the environmental load are different. Therefore the eco-printing judging section 110 calculates evaluation values for each of an environmental performance about the power consumption, an environmental performance about the toner and an environmental performance about the paper from the setting contents that are applied to printing. Specifically, with respect to the setting contents of each setting item, the individual evaluation value e for each environmental performance is determined in advance respectively. The eco-printing judging section 110 obtains an individual evaluation value e1 of the environmental performance about the power consumption, an individual evaluation value e2 of the environmental performance about the toner, an individual evaluation value e3 of the environmental performance about the paper from setting contents that are applied to print as shown in FIG. 10, and sums up each of evaluation values e1, e2 and e3 with respect to plural setting items, and thereby, calculating evaluation values E1, E2 and E3 corresponding to the kind of environmental performance. The logo image granting section 120 performs. The logo image granting section 120 gives a logo image L of every kind of environmental performance depending on each evaluation level E1, E2 and E3.

Figure 11:
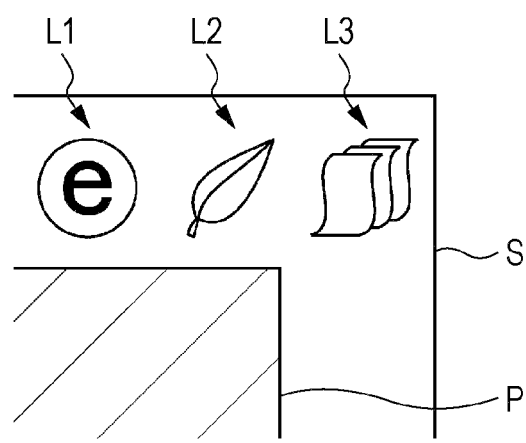
FIG. 11 is an enlarged view illustrating an example of the logo image.

FIG. 11 shows an example of the printing result in a second embodiment. The logo image L1, logo image L2 and logo image L3 are printed on a printing result of FIG. 11. The Logo image L1 is an image that is given depending on evaluation value E1 about the power consumption and shows that an environmental performance about the power consumption corresponds to an eco-printing. The logo image L2 is an image that is given depending on the evaluation value E2 about the toner and shows that the environmental performance about the toner corresponds to an eco-printing. The logo image L3 is an image that is given depending on the evaluation value E3 about the paper and shows that the environmental performance about the paper corresponds to an eco-printing. Therefore, a user can know from this printing result, that the eco-printing about the power consumption, the eco-printing about the toner and the eco-printing about the paper were performed. In addition, in the example of FIG. 11, an example when each logo image L1 to L3 is given one by one is shown, but the number of each logo image, a size, a density and a color may be changed depending on an evaluation value in similar manner to the first embodiment.

According to the second embodiment explained in the above, a user comes to be able to know that eco-printing was performed and how the eco-printing contributed to reduction in the environmental load from a printing result, in addition to the same effect with that of the first embodiment. Accordingly, the consciousness to the environmental measures of a user can be improved more.

Third Embodiment

In the first embodiment, the logo image L by processing in multifunction machine 3 is given by an internal processing off a multifunction machine 3, but, by processing of the external computer side, the logo image L may be given. In the third embodiment, a case where the logo image L is given by processing of the external computer side is explained.

Figure 12:
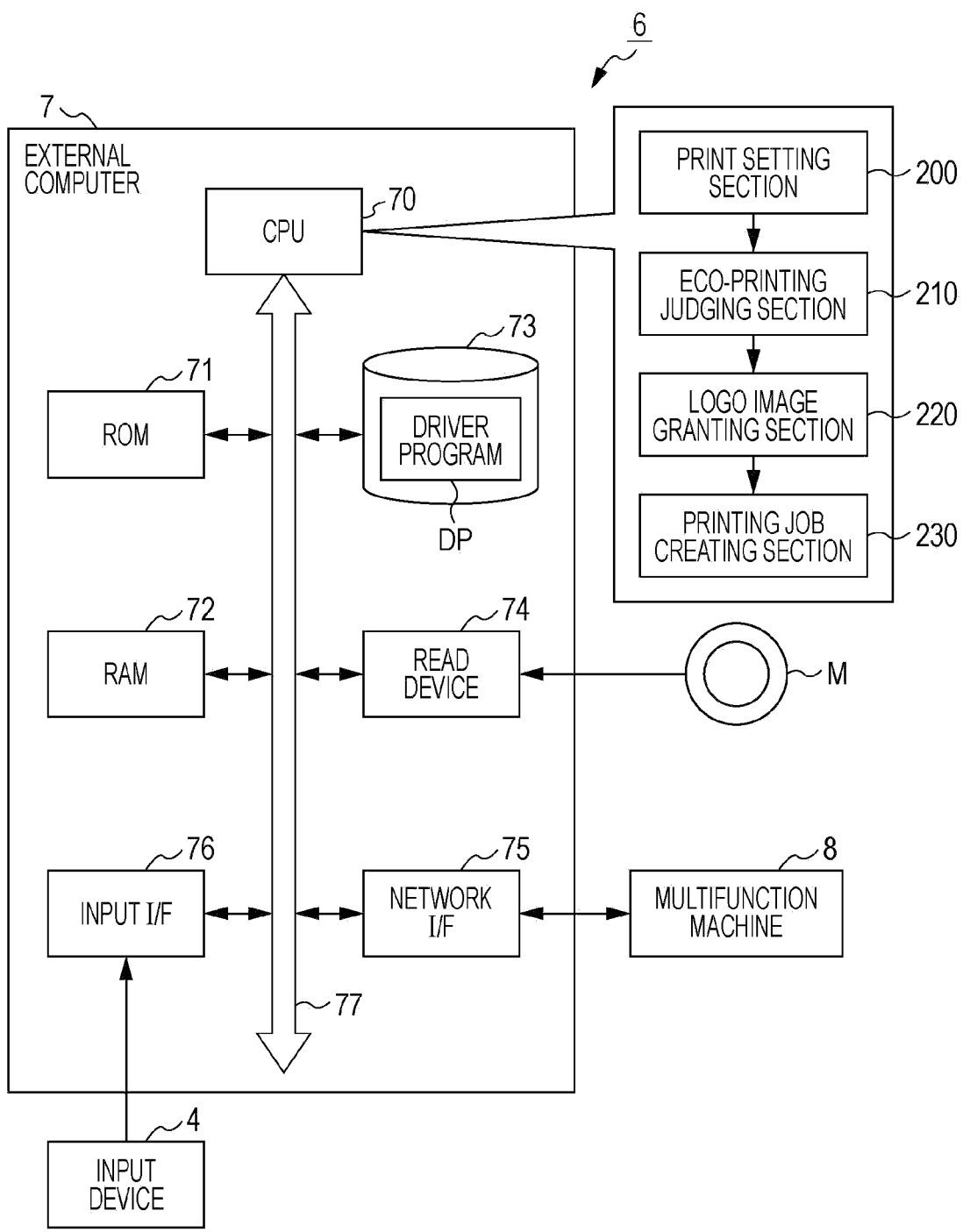
FIG. 12 is a diagram illustrating a schematic configuration of image processing system related to a third embodiment.

FIG. 12 shows a diagram illustrating a schematic configuration of image processing system related to a third embodiment. As shown in FIG. 12, the imaging system 6 includes an external computer 7 and a multifunction machine 8, and the external computer 7 and the multifunction machine 8 are connected with each other to be able to communicate data mutually through networks.

The external computer 7 is an example of the printing controlling unit, and, for example, is a general-purpose personal computer in which a driver software was installed. This external computer 7 includes a CPU 70, a ROM 71, a RAM 72, a hard disk drive 73, a reading device 74, a network I/F (setting data reception section) 75 and an input I/F 76. These components of the external computer 7 are connected to the bus 77, and are able to communicate data through the bus 77.

A driver program (printing control program) DP is stored in advance in the hard disk drive 73. In addition, the driver program DP is supplied to the external computer 7 with a form recorded in a printing medium M, and a program read-out from the printing medium M by the reading device 74 is stored in the hard disk drive 73. In addition, as an example of the printing medium M, a flexible disk, an MO disk, a USB memory and a memory card may be exemplified other than the optical discs such as a CD-ROM and a DVD-ROM. However, a form in which the driver program DP is supplied to the external computer 7 is not limited thereto, and for example, the driver program DP may be supplied from a given server via an electric telecommunication line and an optical communication line.

Network I/F 75 is an interface portion to be connected to the network, and performs a communication with multifunction machine 8 through a network. This network I/F 75 performs processing and so on to receive the device setting data D1 from the multifunction machine 8.

Input I/F 76 is an interface portion to which an input device 4 such as a mouse or a keyboard is connected.

In addition, the CPU 70 of external computer 7 reads-out the driver program DP stored in the hard disk drive 73 and carries it out to install a driver software. Thus, the external computer 7 is a printing controlling unit which becomes the host device of the printer function that the multifunction machine 8 has and transmits printing job to multifunction machine 8. The CPU 70 of the external computer 7 functions as a print setting section 200, an eco-printing in the judging section 210, a logo image granting section 220 and a printing job creating section (printing controlling section) 230.

The print setting section 200 acquires the device setting data D1 from the multifunction machine 8, and determines the setting contents to be applied to printing from the setting contents designated by the input device 4 and the setting contents of the device setting data D1. In addition, in this embodiment, with respect to the items that overlapped with each other among the items of device setting data D1 and the setting items of the print setting designated by input device 4, print setting designated by the input device 4 is preferentially applied. In addition, since the processing that the eco-printing judging section 210 performs and the processing that the logo image granting section 220 performs are similar to the processing that the printing judging section 110 performs and the processing that logo image granting section 120 performs in the first embodiment, a detailed explanation thereof is omitted.

The printing job creating section 230 creates the printing data of the data format that the multifunction machine 8 can process from an image to which a logo image is given, and transmits a printing job including this printing data, a print setting content data which is determined by the print setting section 200 and the print instructions, to the multifunction machine 8. Thus, the external computer 7 causes the multifunction machine 8 to print the image P to which the logo image L is.

According to the third embodiment explained above, similar effects to the first embodiment can be obtained through the processes on the external computer 7 side. In addition, with regard to items which overlap between the settings of the device setting data D1 and the print setting designated by the input device 4, since the print setting designated by the input device 4 is preferentially applied, the print setting that a user designated in the external computer 7 using the input device 4 may be reliably reflected to the printing by the multifunction machine 8. Therefore, it is possible to obtain a printing result with the settings intended by the user who performed the printing instruction operation with respect to the external computer 7, and the user is able to know from the printing result whether or not the printing corresponds to eco-printing.

The first to the third embodiments related to the invention were explained in the above, but the invention is not limited to these embodiments, and is able to be changed and improved without departing from the spirit and claims, and it is a matter of course that all the equivalents thereof are included in the invention. Modification examples will be explained below.

Modification Example 1

In the above first to the third embodiments, in order for a user to understand that a printed matter was printed by eco-printing, the logo image L expressed in a predetermined pattern was printed as an attached image along with an image of the printing target, but this is not limited to an attached image. For example, a character string expressing that the printed matter was printed by eco-printing, or an image of the evaluation value E itself expressing the environmental performance may be attached as the attached image.

Modification Example 2

In the first embodiment mentioned above, the logo image L was attached to the image P through internal processing of the controller 50, but the controller 50 and the printing engine 30 may collaborate with each other and attach the logo image L. For example, the logo image attaching section 120 of the controller may output instructions for performing image forming of the logo image L at the predetermined position in addition to an image P to the printing engine 30, and a control section of the printing engine 30 which receives these instructions may attach the logo image L to the image P by an internal processing of the printing engine 30 and perform printing.

Modification Example 3

In the third embodiment mentioned above, the logo image L was attached to the image P by processing of the external computer 7 side, but the external computer 7 and the multifunction machine 8 may work by collaborating with each other to attach the logo image L. For example, the logo image attaching section 220 of the external computer 7 may output instructions for performing image forming of the data of image P, and the logo image L at the predetermined position to the multifunction machine 8, and the multifunction machine 8 which receives instructions may attach the logo image L to the image P by an internal processing and perform printing.

In addition, for example, with respect to the printing of scan data read in by the multifunction machine 8 side using a copy function or the like, the multifunction machine 8 may transmit the setting content data of the copy to the external computer 7 and may judge whether the printing corresponds to eco-printing on the external computer 7 side. In this case, the external computer 7 judges whether the printing corresponds to eco-printing from the received setting data, and by outputting permission to attach the logo image L to the multifunction machine 8 when the printing corresponds to eco-printing, and causes the multifunction machine 8 to print the image P to which the logo image L is attached. In addition, the external computer 7 may transmit data of the logo image L to the multifunction machine 8 together with permission for attaching the logo image L, and the multifunction machine 8 may attach the logo image L using this data.

Modification Example 4

In the above first to the third embodiments, with respect to the setting items which overlap between setting items of the external computer 2 side and the setting items of the multifunction machine 3 side, setting contents designated in the external computer 2 side were preferentially applied, but content that is set in the multifunction machine 3 side may be preferentially applied. For example, when the manager of the image processing system, through operation of the operation panel of the multifunction machine 3, sets a limit on the print setting for which use is permitted with respect to a user who uses the system, it is desirable to preferentially apply the setting items of the multifunction machine 3 side rather than setting items of the external computer 2 side. In this way, because the logo image L is printed according to the setting contents of the limited print setting, it is possible to know environmentally-friendly whether the printing using the setting content according to the limitation corresponds to environment-friendly printing from the printing result.

Modification Example 5

In the above first to the third embodiments, the threshold value for whether or not the printing corresponds to eco-printing which satisfies a predetermined environmental performance was set in advance, but the threshold value that satisfies a desired environmental performance may be a configuration in which changeable settings are possible. Accordingly, this is able to be customized to match the predetermined environmental load reduction targets which are set by the organizations, companies, groups, industries and the like set.

Modification Example 6

In the above first to the third embodiments, a multifunction machine as an example of the printer was explained, but the printing apparatus may be a printer and a facsimile apparatus. In addition, in the above first to the third embodiments, printing according to the electrophotographic method was explained, but the printing method is not limited thereto and a configuration using other printing methods such as an inkjet method or a heat transfer method may be used.

The entire disclosure of Japanese Patent Application No. 2011-212180, filed Sep. 28, 2011 is expressly incorporated by reference herein.

What is claimed is:

1. A printing apparatus that prints an image comprising:
a central processing unit (CPU) that functions as
   a receiving section that receives image data and print setting data from an external device in communication with the printing apparatus, the image data representing an image, and the print setting data including a plurality of different print settings of the external device;
   a setting section that performs setting based on designated setting content of the printing apparatus, the setting content being designated to contribute to a reduction in environmental load;
   a judging section that judges whether or not printing according to the setting content that is set by the setting section and according to the plurality of different print settings of the external device corresponds to environment-friendly printing which satisfies a predetermined environmental performance;
   an attaching section that attaches an attachment image to the image indicating that printing was performed using environment-friendly printing, when the printing according to the received plurality of different print settings of the external device and according to the setting content that is set corresponds to environment-friendly printing; and
   a printing section that prints the image to which the attachment image is attached, according to the received plurality of different print settings of the external device and according to the setting content that is set by the setting section, wherein the setting content includes a plurality of different print settings of the printing apparatus; and
   the judging section judges whether or not the printing according to the setting content that is set corresponds to the environment-friendly printing, based on a contribution of each of the plurality of different print settings of the printing apparatus and each of the received plurality of different print settings of the external device to an overall environmental performance, and
   the setting section determines whether or not any of the plurality of different print settings of the printing apparatus overlap any of the plurality of different print settings of the external device, and the judging section excludes the overlapped one or more of the plurality of different print settings of the external device or the printing apparatus from the judging.

2. The printing apparatus according to claim 1, wherein the contributions are based on identities of the print settings, and the overall environmental performance is based on a combination of the identities.

3. The printing apparatus according to claim 1, wherein the judging section calculates an evaluation value related to the environmental performance and judges whether or not the printing according to the received plurality of different print settings of the external device and according to the setting content that is set corresponds to environment-friendly printing, based on the evaluation value, the evaluation value corresponds to the overall environmental performance.

4. The printing apparatus according to claim 3, wherein the judging section calculating the evaluation value includes
   obtaining an individual evaluation value for each of the plurality of different print settings, and
   summing the obtained individual evaluation values so as to determine the evaluation value.

5. The printing apparatus according to claim 4, wherein the judging section judging whether or not the printing according to the setting content that is set corresponds to environment-friendly printing includes comparing the evaluation value with a predetermined threshold value.

6. The printing apparatus according to claim 1, wherein a threshold value which satisfies the predetermined environmental performance is changeable.

7. The printing apparatus according to claim 1, wherein the setting of the setting section is performed, based on the kind of environmental performance contributing to a reduction in different kinds of environmental load, and
   the attaching section gives a different attachment image depending on the kind of environmental performance to which the printing according to the setting content contributes.

8. The printing apparatus according to claim 1, wherein the attaching section gives a different attachment image depending on a contribution degree by which the printing contributes to the reduction in the environmental load.

9. The printing apparatus according to claim 1, further comprising:
   an operating section that accepts an operation which designates the setting content contributing to the reduction in the environmental load,
   wherein the setting section preferentially applies the plurality of different print settings of the external device in the print setting data received by the receiving section rather than the setting content that is designated in the operating section.

10. The printing apparatus according to claim 1, further comprising:
    an operating section that accepts an operation which designates the setting content contributing to the reduction in the environmental load
    wherein the setting section preferentially applies the setting content designated in the operating section rather than the plurality of different print settings of the external device in the print setting data received by the receiving section.

11. The printing apparatus according to claim 1, further comprising an operation panel on an outer surface of the printing apparatus that a user operates so as to input the designated setting content to the printing apparatus.

12. The printing apparatus according to claim 1, further comprising a memory that stores processes for the receiving section, the setting section, the judging section, the attaching section, and the printing section.

13. The printing apparatus according to claim 1, wherein the external device includes one of a USB device and a computer.

14. A printing control apparatus that controls printing of image, comprising:
    a central processing unit (CPU) that functions as
    a receiving section that receives image data and print setting data from an external device in communication with the printing apparatus, the image data representing an image, and the print setting data representing a plurality of print settings of the external device;

a setting section that performs setting based on designated setting content of the printing apparatus, the setting content being designated to contribute to a reduction in environmental load;

a judging section that judges whether or not printing according to the setting content that is set by the setting section and according to the plurality of different print settings of the external device corresponds to environment-friendly printing which satisfies a predetermined environmental performance;

an attaching section that attaches an attachment image to the image indicating that printing was performed using environment-friendly printing when the printing according to the received plurality of different print settings of the external device and according to the setting content that is set corresponds to environment-friendly printing; and a printing control section that causes, according to the received plurality of different print settings of the external device and according to the setting content that is set by the setting section, the image to which the attachment image is attached to be printed, wherein the setting content includes a plurality of different print settings of the printing apparatus; and the judging section judges whether or not the printing according to the setting content that is set corresponds to the environment-friendly printing, based on a contribution of each of the plurality of different print settings of the printing apparatus and each of the received plurality of different print settings of the external device to an overall environmental performance, and the setting section determines whether or not any of the plurality of different print settings of the printing apparatus overlap any of the plurality of different print settings of the external device, and the judging section excludes the overlapped one or more of the plurality of different print settings of the external device or the printing apparatus from the judging.

15. The printing control apparatus according to claim 14, further comprising a memory that stores processes for the receiving section, the setting section, the judging section, the attaching section, and the printing control section.

16. A printing control method that controls the printing of an image, comprising:

setting based on designated setting content, the setting content being designated to contribute to a reduction in environmental load, the setting content including a plurality of different print settings of a printing apparatus that prints the image and of an external device that instructs the printing apparatus to print the image;

judging whether or not printing according to the setting content that is set by the setting section corresponds to environment-friendly printing which satisfies a predetermined environmental performance, the judging being based on a contribution of each of the plurality of different print settings to an overall environmental performance;

attaching to the image an attachment image indicating that printing was performed using environment-friendly printing when the printing according to the setting content that is set corresponds to environment-friendly printing; and causing, according to the setting content that is set, the image to which the attachment image is attached to be printed, and determining whether or not any of the plurality of different print settings of the external device overlap any of the plurality of different print settings of the printing apparatus, and excluding the overlapped one or more of the plurality of different print settings of the external device or the printing apparatus from the judging.

* * * * *